(12) United States Patent
Ikeguchi

(10) Patent No.: US 12,337,474 B2
(45) Date of Patent: Jun. 24, 2025

(54) ROBOT TEACHING SYSTEM

(71) Applicant: DAIHEN Corporation, Osaka (JP)

(72) Inventor: Makoto Ikeguchi, Osaka (JP)

(73) Assignee: DAIHEN Corporation, Osaka (JP)

( * ) Notice: Subject to any disclaimer, the term of this patent is extended or adjusted under 35 U.S.C. 154(b) by 311 days.

(21) Appl. No.: 17/897,443

(22) Filed: Aug. 29, 2022

(65) Prior Publication Data

US 2023/0147777 A1 May 11, 2023

(30) Foreign Application Priority Data

Nov. 5, 2021 (JP) .................................. 2021-181000

(51) Int. Cl.
| | | |
|---|---|---|
| *B25J 9/00* | (2006.01) | |
| *B23K 9/095* | (2006.01) | |
| *B25J 9/16* | (2006.01) | |
| *B25J 11/00* | (2006.01) | |
| *B25J 19/02* | (2006.01) | |

(52) U.S. Cl.
CPC ........... *B25J 9/0081* (2013.01); *B23K 9/0953* (2013.01); *B23K 9/0956* (2013.01); *B25J 9/1664* (2013.01); *B25J 11/005* (2013.01); *B25J 19/023* (2013.01)

(58) Field of Classification Search
CPC ...... B25J 9/0081; B25J 9/1664; B25J 11/005; B25J 19/023; B23K 9/0953; B23K 9/0956
See application file for complete search history.

(56) References Cited

U.S. PATENT DOCUMENTS

| | | | | |
|---|---|---|---|---|
| 10,065,320 B2* | 9/2018 | Uchiyama | ............... | B25J 9/1697 |
| 2008/0027580 A1* | 1/2008 | Zhang | .................... | B25J 9/1633 |
| | | | | 700/245 |
| 2016/0039094 A1* | 2/2016 | Lundberg | ............... | B25J 9/1692 |
| | | | | 700/251 |
| 2017/0203434 A1* | 7/2017 | Ueda | ....................... | B25J 9/0081 |
| 2019/0082098 A1 | 3/2019 | Costa et al. | | |
| 2020/0269340 A1* | 8/2020 | Tang | .................... | G06V 10/145 |
| 2021/0114231 A1* | 4/2021 | Katagiri | ................. | B25J 9/1664 |

FOREIGN PATENT DOCUMENTS

| | | | | |
|---|---|---|---|---|
| CN | 113878576 A | * | 1/2022 | |
| JP | H02-235112 A | | 9/1990 | |
| JP | H-0659713 A | * | 3/1994 | |

(Continued)

*Primary Examiner* — Truc M Do
(74) *Attorney, Agent, or Firm* — Sterne, Kessler, Goldstein & Fox P.L.L.C.

(57) ABSTRACT

A robot teaching system includes: a photographing unit that photographs an image including a welding target and a marker installed on an industrial robot; a camera coordinate system setting unit that sets a camera coordinate system on a basis of the marker included in the image; an operation path setting unit that sets an operation path of the industrial robot on a basis of a welding position of the welding target included in the image in the camera coordinate system; and a program generation unit that generates a working program, while converting the set operation path from the camera coordinate system into a robot coordinate system set in a robot control apparatus on a basis of a position of the marker installed on the industrial robot. The robot teaching system generates a working program allowing appropriate welding at a welding position.

5 Claims, 8 Drawing Sheets

(56) References Cited

FOREIGN PATENT DOCUMENTS

| JP | 524521 | B | | 7/2013 | | |
|---|---|---|---|---|---|---|
| JP | 6279060 | B | | 2/2018 | | |
| JP | 2020-534051 | A | | 11/2020 | | |
| JP | 2021-062463 | A | | 4/2021 | | |
| KR | 2020069713 | A | * | 6/2020 | ............. | B23K 31/02 |

* cited by examiner

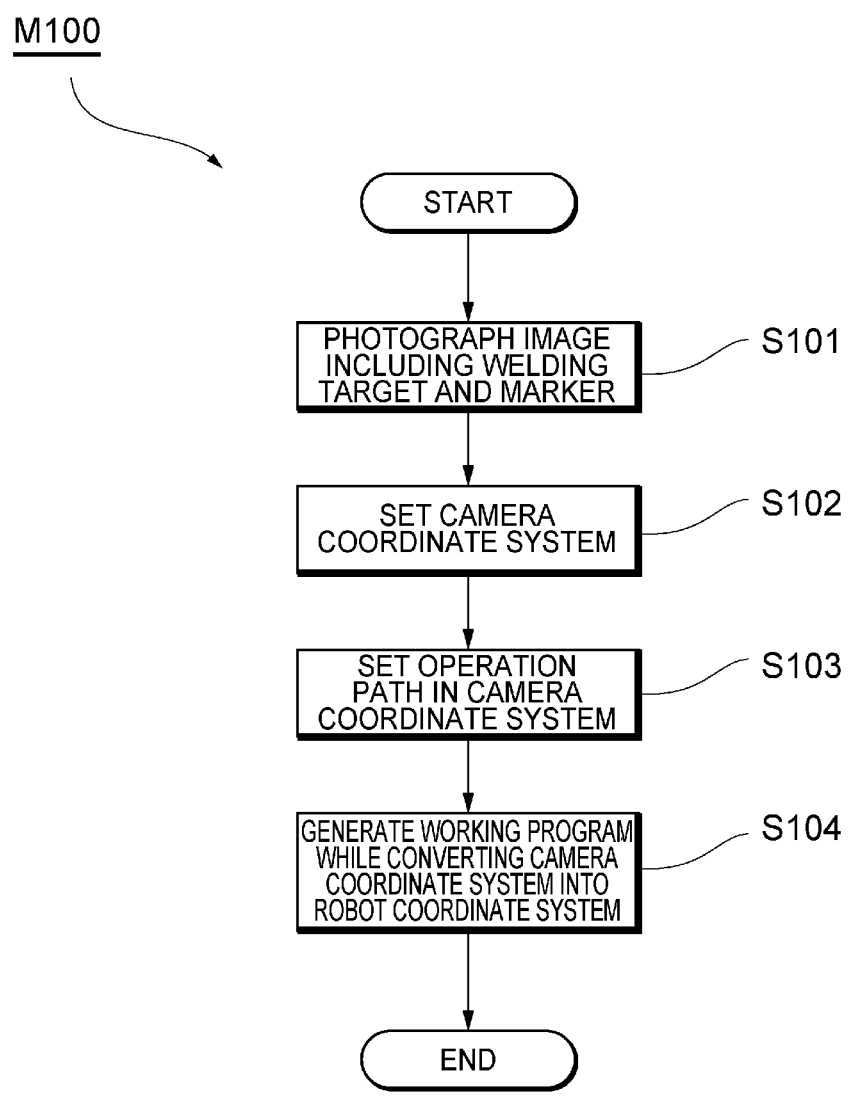

ROBOT TEACHING SYSTEM

BACKGROUND

Field

The present invention relates to a robot teaching system.

Description of Related Art

In recent years, many robots have become prevalent in industrial fields. The robots are used in, for example, assembling of electronic components and machine components, welding, transportation, or the like, making production lines of factories more efficient and automatized. A working program for causing such robots to perform a desired operation needs to be generated and stored in advance as so-called teaching data. In order to generate the teaching data, an operator cooperates with a robot control apparatus using a teaching pendant and operates an actual robot to record the operation.

When an operator generates teaching data while actually operating a robot using a teaching pendant, dependence on the skills of the operator is large and a long time is needed in some cases. Particularly, in order to record the precise operation of a robot, it is necessary to depend on a skilled person who understands the operation of the robot in detail and is accustomed to the operation of a teaching pendant.

In order to reduce burdens on an operator, a robot system that recognizes the position of a robot using an AR device and a marker has been disclosed (for example, Patent Publication JP-A-2021-62463).

The robot system disclosed in Patent Publication JP-A-2021-62463 is configured so that the position or orientation of a coordinate system set on a robot coordinate system specifying marker with respect to a plurality of reference markers is recognized using the plurality of reference markers and the robot coordinate system specifying marker. Thus, it is possible to recognize the position or orientation of a robot with an AR device.

SUMMARY

However, in the robot system disclosed in Patent Publication JP-A-2021-62463, it is necessary to install a plurality of reference markers and a robot coordinate system specifying marker. Further, in a robot teaching system, it is necessary to appropriately generate a working program in consideration of an appropriate robot operation while ascertaining the positions of a robot and a welding spot.

In view of this, the present invention has an object of providing a robot teaching system that generates a working program allowing appropriate welding at a welding position using an image photographed by a camera.

An aspect of the present invention provides a robot teaching system including: a photographing unit that photographs an image including a welding target and a marker installed on an industrial robot; a camera coordinate system setting unit that sets a camera coordinate system on a basis of the marker included in the image; an operation path setting unit that sets an operation path of the industrial robot on a basis of a welding position of the welding target included in the image in the camera coordinate system; and a program generation unit that generates a working program for operating the industrial robot, while converting the operation path of the industrial robot set by the operation path setting unit from the camera coordinate system into a robot coordinate system set in a robot control apparatus on a basis of a position of the marker installed on the industrial robot.

According to the aspect, the photographing unit photographs an image including a welding target and a marker installed on an industrial robot, and the camera coordinate system setting unit sets a camera coordinate system on a basis of the marker included in the image. The program generation unit generates a working program for operating the industrial robot, while converting an operation path of an industrial robot set in the camera coordinate system into a robot coordinate system set in a robot control apparatus on a basis of a position of the marker installed on the industrial robot. Thus, it is possible to generate a working program allowing appropriate welding at a welding position. Further, since a welding target and a marker are simultaneously photographed, it is possible to simultaneously detect a welding position of the welding target while performing calibration to convert from a camera coordinate system into a robot coordinate system. Moreover, even in a situation in which the installation of a marker near a welding target is not allowed since the marker is installed on an industrial robot, it is possible to appropriately detect a welding position of the welding target on a basis of the marker installed on the industrial robot.

In the above aspect, the marker may be installed on a tip end of the industrial robot, the tip end being a position moving similarly to an end effector attached to a tip of a manipulator.

According to the aspect, a marker is installed on a tip end of an industrial robot that is a position moving similarly to an end effector attached to a tip of a manipulator. Therefore, the photographing unit is allowed to photograph an image with a marker moved close to a welding position of a welding target when the manipulator is operated. Thus, a relative position between the marker and the welding position becomes short. An error hardly occurs as the relative position between the marker and the welding position becomes closer.

In the above aspect, the operation path setting unit may set the operation path of the industrial robot on a basis of a welding position extracted from welding position candidates, the welding position candidates being detected when the image is subjected to image processing.

According to the aspect, welding position candidates are detected when an image is subjected to image processing, and a welding position is extracted from the welding position candidates. Thus, the operation path setting unit is allowed to set an operation path of an industrial robot on a basis of a more appropriately extracted welding position.

In the above aspect, the operation path setting unit may set the operation path of the industrial robot on a basis of a welding order set with respect to the welding position.

According to the aspect, the operation path setting unit sets an operation path of an industrial robot on a basis of a welding order set with respect to a welding position. Therefore, it is possible to more appropriately set an operation path of an industrial robot in consideration of a set welding order.

In the above aspect, the operation path setting unit may select whether welding is necessary or not and/or set a welding order, to set the operation path of the industrial robot according to a distance between the welding position and a welding torch.

According to the aspect, the operation path setting unit appropriately sets necessity of welding and/or a welding order according to a distance between a welding position and a welding torch. Therefore, it is possible to more appropriately set an operation path of an industrial robot.

In the above aspect, the welding order may be selected in order from a specific direction.

According to the aspect, welding is performed in order from an upper position, a lower position, a left position, or a right position of an image or is performed in order from a lower position to a higher position with respect to a gravity direction among welding positions included in an image as a specific direction. Thus, it is possible to reduce a butting error or the like due to thermal distortion or the like of a workpiece during welding according to assembling of the workpiece and reduce drooping of bead or the like.

According to the present invention, it is possible to provide a robot teaching system that generates a working program allowing appropriate welding at a welding position using an image photographed by a camera.

BRIEF DESCRIPTION OF DRAWINGS

FIG. 8 is a flowchart showing the flow of the processing of a robot teaching method M100 performed by the robot teaching system 200 according to an embodiment of the present invention.

DETAILED DESCRIPTION

Hereinafter, an embodiment of the present invention will be specifically described with reference to the accompanying drawings. Note that the following embodiment only shows a specific example for carrying out the present invention and does not intend to interpret the present invention in a limited way. Further, in order to facilitate the understanding of the description, the same constituting elements are denoted by the same symbols as much as possible in the respective drawings, and duplicated descriptions may be omitted in some cases.

EMBODIMENT

Basic Configuration of Welding Robot System

Figure 1:
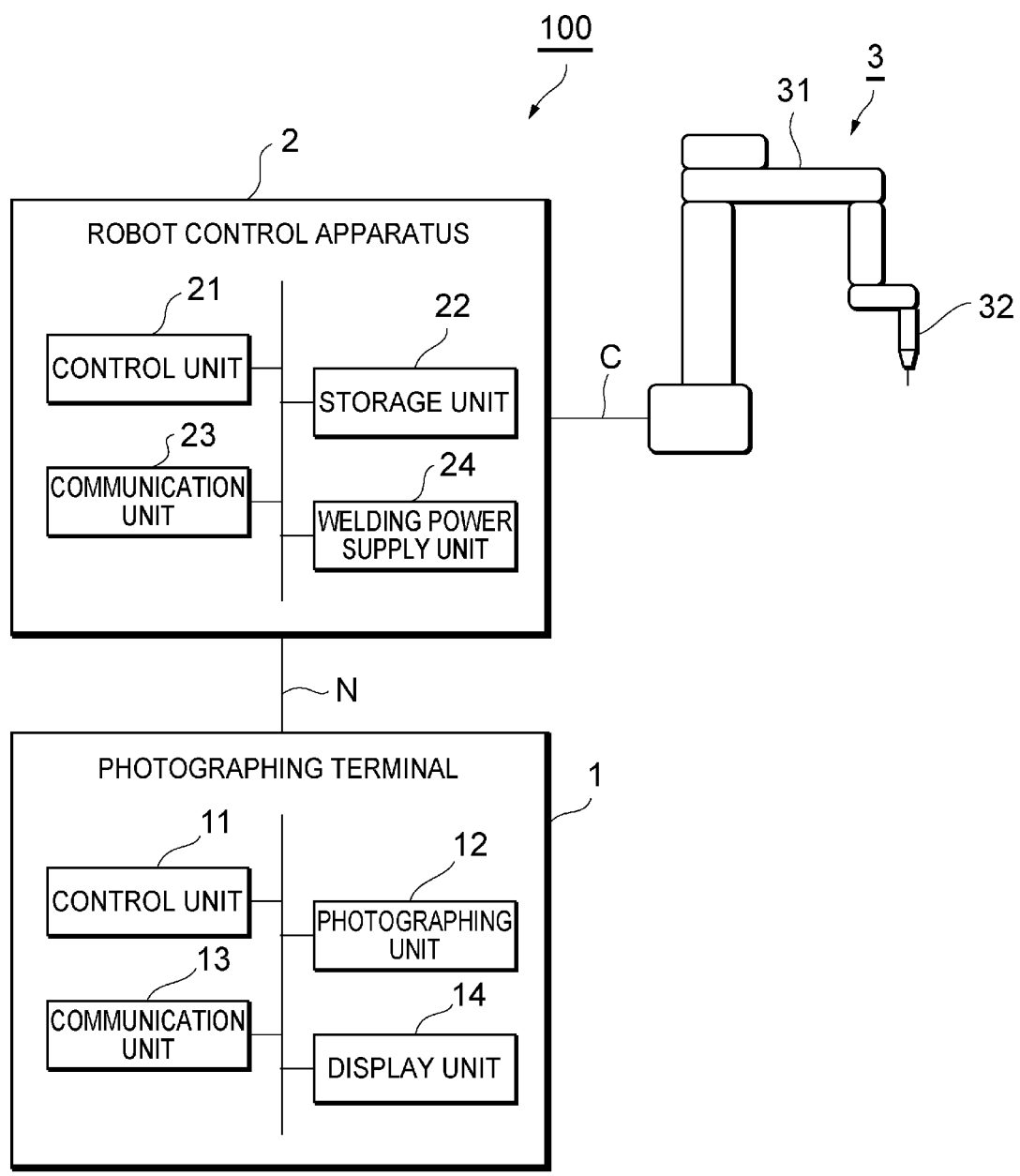
FIG. 1 is a diagram exemplifying the configuration of a welding robot system 100 including a robot teaching system according to an embodiment of the present invention.

FIG. 1 is a diagram exemplifying the configuration of a welding robot system 100 including a robot teaching system according to an embodiment of the present invention. As shown in FIG. 1, the welding robot system 100 includes, for example, a photographing terminal 1, a robot control apparatus 2, and a manipulator 3. The photographing terminal 1 and the robot control apparatus 2 are connected to each other via, for example, a network N, and the robot control apparatus 2 and the manipulator 3 are connected to each other via, for example, a communication cable C. The network N may be a wired network (including a communication cable) or a wireless network. Note that the welding robot system 100 may include a teaching pendant. The teaching pendant is an operating apparatus with which an operator teaches the operation of the manipulator 3.

The manipulator 3 is a welding robot (industrial robot) that performs arc welding according to construction conditions set in the robot control apparatus 2. The manipulator 3 has, for example, an articulated arm 31 provided on a base member fixed to a floor or the like of a factory and a welding torch 32 (end effector) connected to the tip end of the articulated arm 31.

The robot control apparatus 2 is a control unit that controls the operation of the manipulator 3 and includes, for example, a control unit 21, a storage unit 22, a communication unit 23, and a welding power supply unit 24.

The control unit 21 runs, for example, a working program stored in the storage unit 22 with a processor to control the manipulator 3 and the welding power supply unit 24.

The communication unit 23 controls communication with the photographing terminal 1 connected via the network N or communication with the manipulator 3 connected via the communication cable C.

The welding power supply unit 24 supplies, in order to, for example, generate an arc between the tip end of a welding wire and a workpiece, a welding current, a welding voltage, or the like to the manipulator 3 according to previously-set welding construction conditions. The welding construction conditions include, for example, data items such as a welding condition, a welding start position, a welding end position, an arc discharge time, a welding distance, and the attitude and movement speed of a welding torch. The welding power supply unit 24 may be provided separately from the robot control apparatus 2.

The photographing terminal 1 is, for example, a digital camera but may be a portable terminal with a digital camera. The portable terminal includes, for example, a portable terminal such as a tablet terminal, a smart phone, a mobile information terminal (PDA), and a notebook PC (personal computer). The photographing terminal 1 includes, for example, a control unit 11, a photographing unit 12, a communication unit 13, and a display unit 14.

The control unit 11 runs a prescribed program stored in a memory with a processor to control the respective units of the photographing terminal 1.

The photographing unit 12 includes, for example, a lens and imaging element (image sensor) and converts the light of a subject received by the lens into an electric signal (digital image data).

The communication unit 13 controls communication with the robot control apparatus 2 connected via the network N.

The display unit 14 is, for example, a display having a touch panel, displays an image of a subject photographed by the photographing unit 12, and receives an input such as operating instructions by an operator. The display unit 14 may be provided separately from the photographing terminal 1 as, for example, a display apparatus having a touch panel.

Configuration of Robot Teaching System

Figure 2:
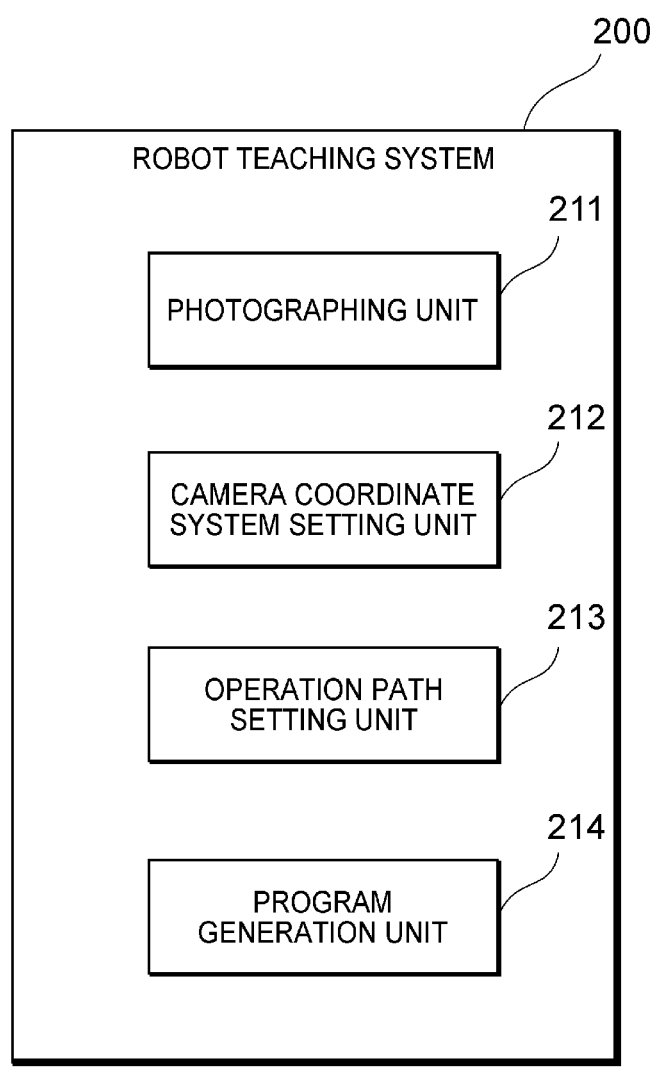
FIG. 2 is a diagram exemplifying the functional configuration of a robot teaching system 200 according to an embodiment of the present invention.

FIG. 2 is a diagram exemplifying the functional configuration of a robot teaching system 200 according to an embodiment of the present invention. As shown in FIG. 2, the robot teaching system 200 includes, for example, a photographing unit 211, a camera coordinate system setting unit 212, an operation path setting unit 213, and a program generation unit 214 as the functional configuration. Among these functions, the photographing unit 211 is a function provided in the photographing terminal 1. On the other hand, all the camera coordinate system setting unit 212, the operation path setting unit 213, and the program generation unit 214 may be provided in any of the photographing terminal 1 and the robot control apparatus 2, or the respective functions of the camera coordinate system setting unit 212, the operation path setting unit 213, and the program generation unit 214 may be dispersively provided in the photographing terminal 1 and the robot control apparatus 2. Further, apparatuses other than the photographing terminal 1 and the robot control apparatus 2 may include a part or all of the above functions.

The photographing unit 211 is the same as the photographing unit 12 of the photographing terminal 1. The photographing unit 211 according to the present embodiment photographs an image including a workpiece and a marker provided on the manipulator 3. For example, the photographing unit 211 photographs an image simultaneously including a workpiece and a marker installed on the welding torch 32 attached to the tip end of the manipulator 3. Further, information on the position and attitude of the manipulator 3 controlled by the robot control apparatus 2 at the photographing of the image is stored so as to be associated with the image, and is used for calibration between a camera coordinate system and a robot coordinate system that will be described later.

The camera coordinate system setting unit 212 sets a camera coordinate system on the basis of a marker included in an image photographed by the photographing unit 211. For example, the camera coordinate system setting unit 212 sets, with the position of a marker as an origin in an image photographed by the photographing unit 211, a three-dimensional orthogonal coordinate system based on X, Y, and Z axes orthogonal to each other at the origin as a camera coordinate system.

The operation path setting unit 213 sets, in a camera coordinate system set by the camera coordinate system setting unit 212, the operation path of the manipulator 3 on the basis of the welding position of a workpiece included in an image photographed by the photographing unit 211. For example, the operation path setting unit 213 causes a user to manually select the operation path of the manipulator 3 (welding torch 32) or calculates and automatically sets a distance between a welding position and the welding torch 32 so that the welding torch 32 attached to the tip end of the manipulator 3 operates along the welding position of a workpiece in an image photographed by the photographing unit 211. Note that the welding position may be extracted in such a manner that an image photographed by the photographing unit 211 is subjected to image processing to detect welding position candidates and one of the candidates is selected by the user. Further, the welding position is not limited to one extracted from the welding position candidates by the user but may be, for example, automatically extracted from the welding position candidates according to previously-set conditions.

The program generation unit 214 generates a working program for operating the manipulator 3, while converting the operation path of the manipulator 3 set by the operation path setting unit 213 from a camera coordinate system into a robot coordinate system set in the robot control apparatus 2 on the basis of the position of a marker set on the manipulator 3.

Specifically, as described above, the operation path setting unit 213 sets the operation path of the manipulator 3 in a camera coordinate system set by the camera coordinate system setting unit 212 on the basis of an image photographed by the photographing unit 211. On the other hand, the robot control apparatus 2 grasps the position of a marker installed on the manipulator 3 and retains a robot coordinate system on the basis of the position of the marker. The program generation unit 214 converts the operation path of the manipulator 3 in the camera coordinate system into the robot coordinate system on the basis of the position of the marker to set a path on which the manipulator 3 actually operates, and generates a working program to appropriately perform welding at a welding position.

Here, conversion from a camera coordinate system into a robot coordinate system will be described. The program generation unit 214 acquires information on the position and attitude of the manipulator 3 based on an image photographed by the photographing unit 211, more specifically, information on the position and attitude of the welding torch 32 in a camera coordinate system set on the basis of at least a marker. On the other hand, the program generation unit 214 acquires information on the position and attitude of the manipulator 3 controlled by the robot control apparatus 2 at the photographing of the image. The information on the position and attitude of the manipulator 3 controlled by the robot control apparatus 2 is information on the angles of the respective shafts of the manipulator 3 controlled by the robot control apparatus 2, or the like. It is possible to grasp the position and attitude of the manipulator 3 from the information (robot coordinate system). Then, on the basis of the information (camera coordinate system) on the position and attitude of the welding torch 32 in the camera coordinate system set on the basis of the marker included in the image photographed by the photographing unit 211 and the information (robot coordinate system) on the position and attitude of the manipulator 3 controlled by the robot control apparatus 2 at the photographing of the image, it is possible to convert the camera coordinate system into the robot coordinate system.

That is, calibration for matching the camera coordinate system with the marker included in the image photographed by the photographing unit 211 as a reference (origin) and the robot coordinate system with the angles of the respective shafts controlled by the robot control apparatus 2 at the photographing of the image as a reference to each other is performed. Note that since the photographing terminal 1 and the robot control apparatus 2 are connected to each other via the network N as described above, the information on the angles of the respective shafts of the manipulator 3 controlled by the robot control apparatus 2 or the like is only required to be stored when the image is photographed by the photographing terminal 1.

As described above, the program generation unit 214 is only required to convert, using information (camera coordinate system) on the position and attitude of the manipulator 3 included in an image photographed by the photographing unit 211 and information (robot coordinate system) on the position and attitude of the manipulator 3 grasped by the robot control apparatus 2 at the photographing of the image, the operation path of the manipulator 3 in the camera coordinate system into the robot coordinate system to set a path on which the manipulator 3 actually operates.

As described above, a working program in which the manipulator 3 appropriately performs welding at a welding position is generated using an image including a workpiece and a marker photographed by the photographing unit 211 in the robot teaching system 200. Then, the working program is stored in the storage unit of the robot control apparatus 2, and the robot control apparatus 2 controls the operation of the manipulator 3 on the basis of the working program. Thus, it is possible to appropriately perform welding at the welding position of a workpiece as a welding robot system.

Specific State in Respective Processing of Robot Teaching System

Next, a specific state in which an image is photographed using the photographing terminal 1 and a working program allowing appropriate welding at a welding position is generated will be described in detail.

Figure 3:
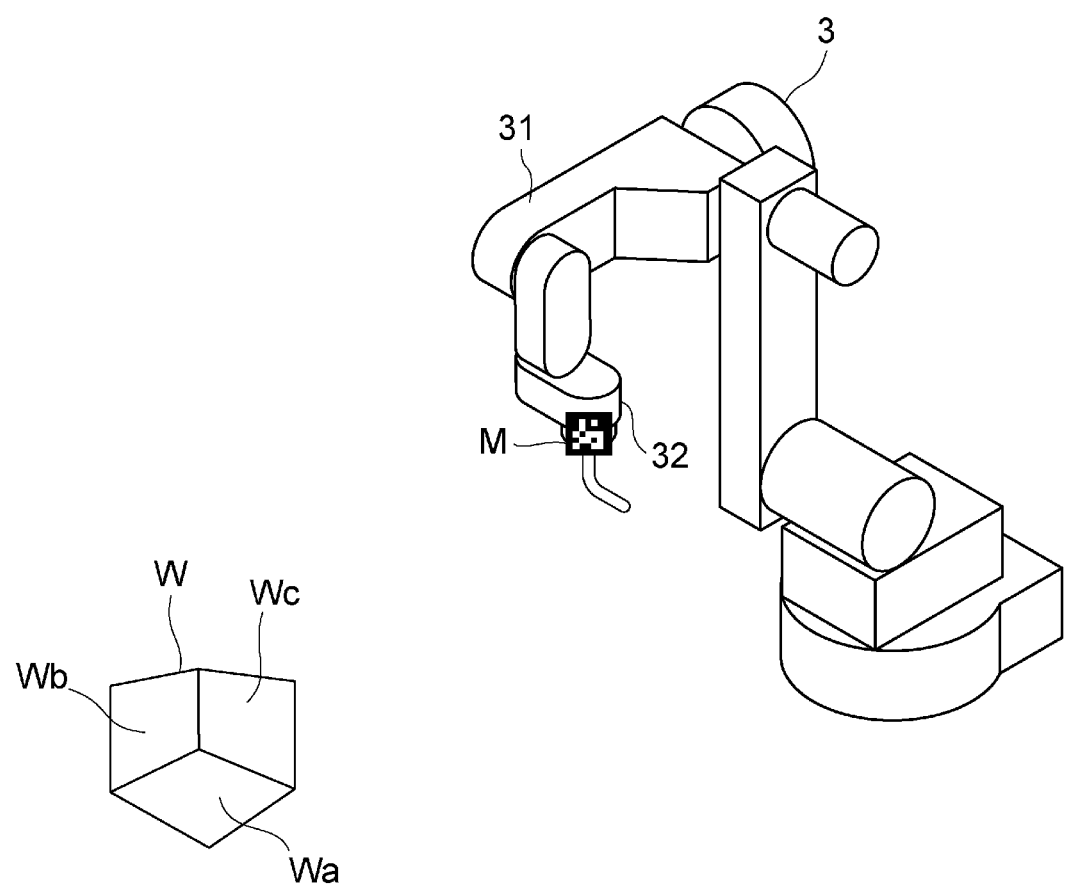
FIG. 3 is a diagram showing the state of a welding robot system in which a workpiece W serving as a welding target and a marker M are installed.

FIG. 3 is a diagram showing the state of a welding robot system in which a workpiece W serving as a welding target and a marker M are installed. As shown in FIG. 3, the workpiece W is a structural object composed of one workpiece Wa serving as a bottom plate and two workpieces Wb and Wc serving as side plates, and the marker M is installed on the welding torch 32 (end effector) attached to the tip end of the manipulator 3.

Here, the robot control apparatus 2 controls a position, a direction, or the like to operate the manipulator 3 having the articulated arm 31 and the welding torch 32 in a previously-set robot coordinate system. The marker M serves as a reference for calibration between the robot coordinate system and a camera coordinate system that will be described later, and the robot control apparatus 2 needs to accurately grasp a position at which the marker M is set. The marker M is preferably accurately installed at a previously-determined position grasped by the robot control apparatus 2.

Figure 4:
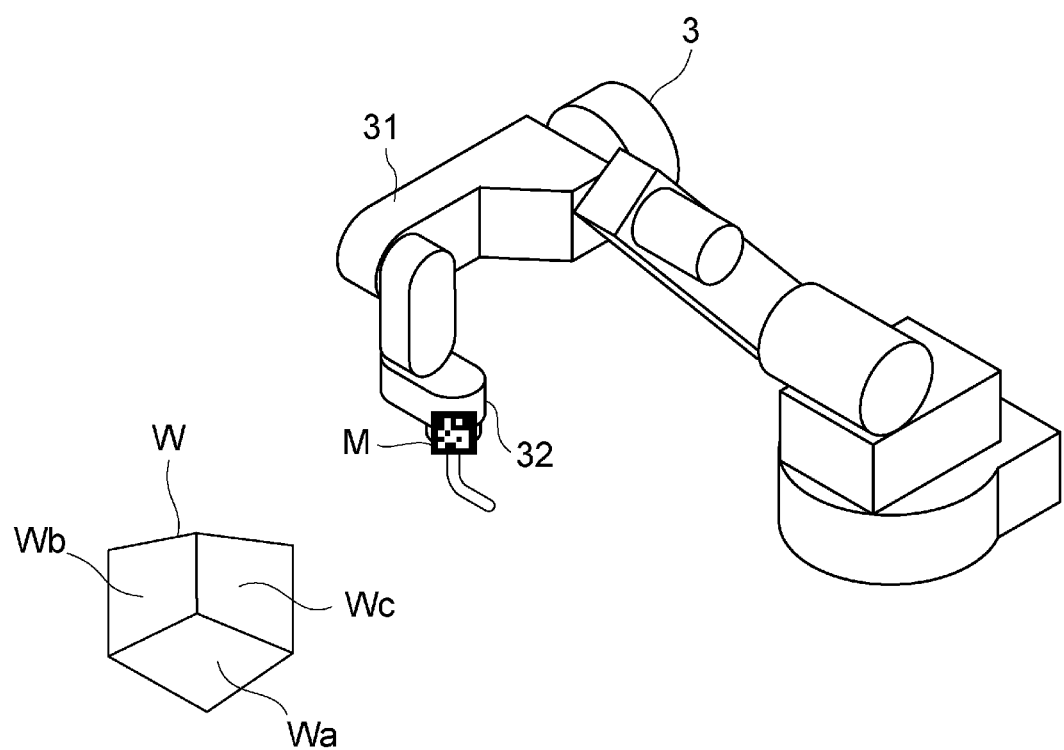
FIG. 4 is a diagram showing a state in which a marker M is moved close to a workpiece W.

FIG. 4 is a diagram showing a state in which a marker M is moved close to a workpiece W. As shown in FIG. 4, the marker M installed on the welding torch 32 is moved close to the workpiece W by, for example, the operation of the manipulator 3. In a state in which the marker M and the workpiece W are placed close to each other, it is easy to photograph an image simultaneously including the marker M and the workpiece W with the photographing unit 211. Further, since a distance (relative position) between the marker M and the workpiece W decreases, it is possible to reduce influence due to a measurement error.

Figure 5:
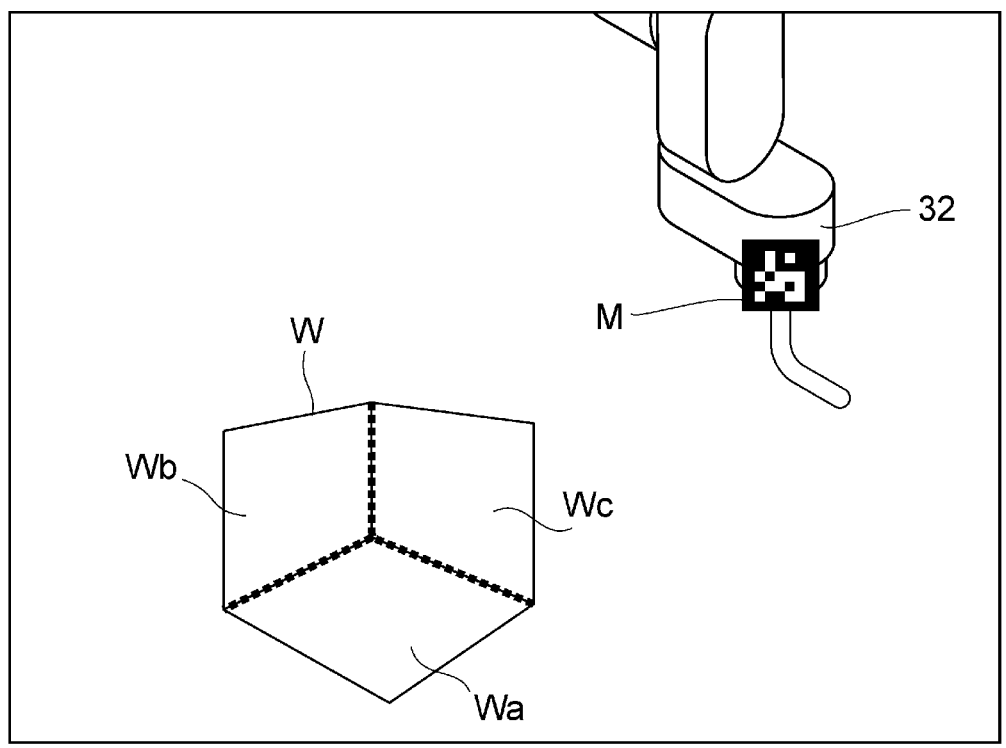
FIG. 5 is a diagram showing an image photographed so as to include a workpiece W and a marker M.

FIG. 5 is a diagram showing an image photographed so as to include a workpiece W and a marker M. As shown in FIG. 5, the image simultaneously including the workpiece W and the marker M is photographed by the photographing unit 211. For example, in order to prevent the occurrence of lacking, distortion, interference with peripheral equipment or the like, blurring in a spot serving as a welding position candidate of the workpiece W or a part of the marker M in an image photographed by the photographing unit 211, the photographing unit 211 appropriately photographs the sport serving as the welding position candidate of the workpiece W and the marker M.

In other words, the marker M needs to be installed on the welding torch 32 of the manipulator 3 so as not to be deviated, distorted, or hardly broken, and the manipulator 3 needs to be operated to move the marker M installed on the welding torch 32 close to the workpiece W so that a spot serving as a welding position candidate of the workpiece W and the marker M are allowed to be appropriately and simultaneously photographed.

Note that the marker M is installed on the welding torch 32 here. However, if the marker M is appropriately photographed simultaneously with a spot serving as a welding position candidate of the workpiece W by the operation of the manipulator 3, the marker M may be installed at, for example, a place near the welding torch 32 or other positions of the welding robot (manipulator 3). Here, the marker M is attached to a tip end that is a position moving similarly to the welding torch 32 (end effector) attached to the tip end of the manipulator 3.

For example, the marker M may be installed on the end effector (welding torch 32), a bracket for attaching the end effector to the manipulator 3, or the six-axis driving portion of the manipulator 3.

By the installation of the marker M at the tip end that is a position moving similarly to the welding torch 32 (end effector) attached to the tip end of the manipulator 3 as described above, the positional relationship between the marker M and the welding torch 32 (for example, TCP: Tool Center Position) remains changed. Thus, when the operation path of the welding robot is set to appropriately perform welding at a welding position, it is possible to easily specify a TCP and reduce a computation amount. If the positional relationship between the marker M and the TCP changes according to the position and attitude of the manipulator 3, the position and attitude of the manipulator 3 has to be taken into consideration to specify the TCP, which results in a possibility of an increase in a computation amount.

Figure 6:
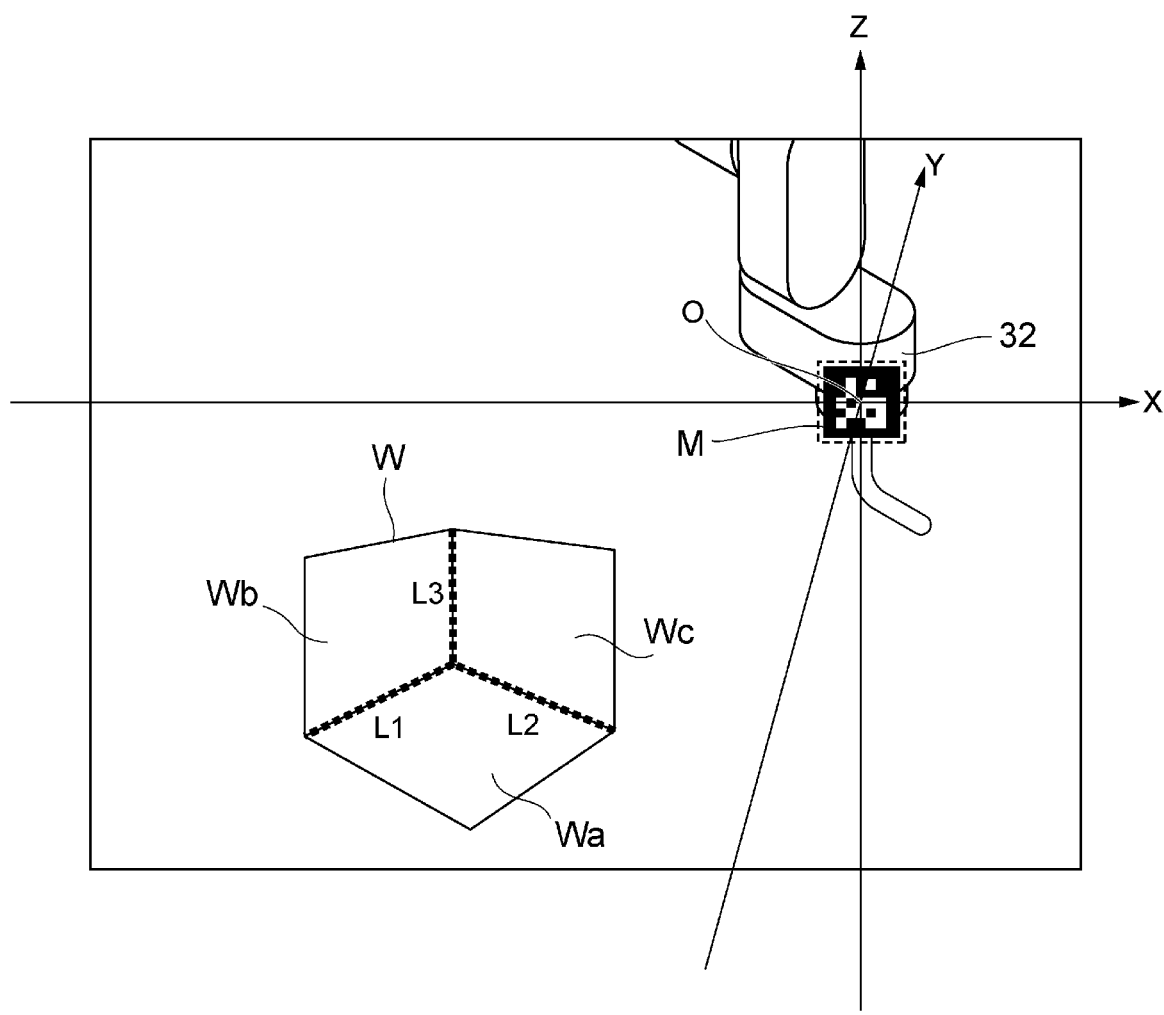
FIG. 6 is a diagram showing a state in which a camera coordinate system is set on the basis of a marker M included in a photographed image.

FIG. 6 is a diagram showing a state in which a camera coordinate system is set on the basis of a marker M included in a photographed image. As shown in FIG. 6, the marker M is detected from an image photographed by the photographing unit 211, and a three-dimensional orthogonal coordinate system based on X, Y, and Z axes orthogonal to each other at an origin O is set as a camera coordinate system with the position of the marker M as the origin O.

Here, the marker M is only required to be an identifier that allows the photographing unit 211 to recognize that the marker M is placed inside a space. As a marker, an AR (Augmented Reality) marker is, for example, preferably used. By the use of the AR marker, it is possible to easily display the camera coordinate system with an AR marker as an origin so as to overlap an actual image when the AR marker placed inside a space is recognized.

Moreover, as shown in FIG. 6, welding lines L1, L2, and L3 of a workpiece W are extracted. Specifically, the workpiece W is a structural object composed of one workpiece Wa serving as a bottom plate and two workpieces Wb and We serving as side plates, and displayed as a welding target. Respective crossing lines L1, L2, L3 of the workpieces Wa, Wb, and We are extracted as welding lines.

As an example of a method for extracting the welding lines L1, L2, and L3, an image photographed by the photographing unit 211 may be displayed on the display screen of a tablet terminal or the like (for example, the display unit 14 of the photographing terminal 1) and selected and extracted by a user. Specifically, an image displayed on a display screen may be traced by the user to extract the welding lines L1, L2, and L3.

Here, when a marker is installed at an actual welding position, the marker may include information such as the attitude of the tip end of the welding torch 32 with respect to the welding position, a welding speed, a welding order, and a specific target position. Specifically, when a marker includes information instructing the tip end of the welding torch 32 to contact a welding position at 45 degrees, it is also possible to set the attitude of the manipulator 3 on the basis of the marker. Further, when there are a plurality of welding positions (welding lines), it is also possible to set the operation path of the manipulator 3 if respective markers include a welding order.

Further, the welding lines L1, L2, and L3 may be automatically extracted using a 3D camera. Specifically, using, for example, a distance measurement sensor such as a LiDAR (Light Detection and Ranging) sensor, point group data corresponding to a workpiece W of an image photographed by the photographing unit 211 is acquired. Then, on the basis of the point group data drawn on a camera coordinate system, the shape of the workpiece W may be recognized, and a portion recognized as a straight line may be extracted as a welding line.

Note that a method for extracting the welding lines L1, L2, and L3 is not limited to the above methods but the welding lines L1, L2, and L3 may be extracted using, for example, other image processing or the like so long as it is possible to appropriately extract the welding lines L1, L2, and L3 from an image photographed by the photographing unit 211.

Figure 7:
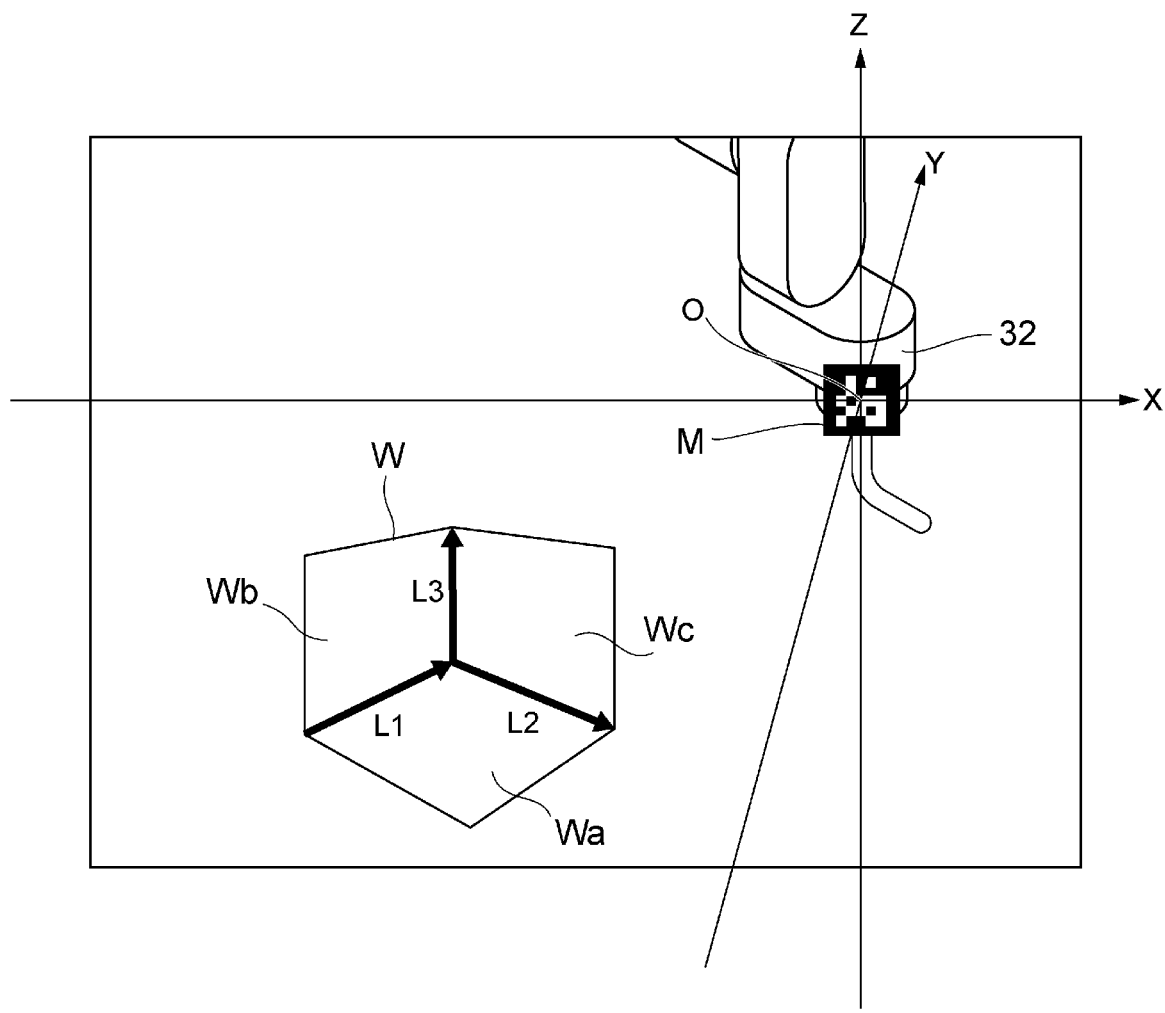
FIG. 7 is a diagram showing a state in which the operation path of a welding robot is set on the basis of the welding position of a workpiece W included in an image in a camera coordinate system.

FIG. 7 is a diagram showing a state in which the operation path of a welding robot is set on the basis of the welding position of a workpiece W included in an image in a camera coordinate system. As shown in FIG. 7, the operation path of the manipulator 3 is set so that welding lines L1, L2, and L3 are welded in order.

The operation path of the manipulator 3 may be set by, for example, the selection of the welding lines L1, L2, and L3 by a user on the display screen of a tablet terminal or the like. The user may set a welding order, trace a welding direction with a finger, or set a welding speed with respect to the welding lines L1, L2, and L3.

Further, the operation path of the manipulator 3 may be set according to, for example, distances between the welding lines L1, L2, and L3 and the welding torch 32. Specifically, welding may start from a welding line closer to the welding torch 32, or the operation path of the welding robot may be set so that the movement distance of the welding torch 32 becomes short when all the welding lines L1, L2, and L3 are welded.

Note that a method for setting the operation path of the manipulator 3 to weld the welding lines L1, L2, and L3 is not limited to the above methods but the operation path of the manipulator 3 may be set using, for example, an AI or the like so long as it is possible to appropriately weld the welding lines L1, L2, and L3.

Specifically, as the operation path of the manipulator 3, welding may be performed in order from an upper position, a lower position, a left position, or a right position of an image among welding positions included in the image. For example, a direction corresponding to assembling such as whether workpieces are connected to each other horizontally or vertically is specified. Thus, it is possible to reduce a butting error or the like due to thermal distortion or the like of a workpiece during welding.

Further, as the operation path of the manipulator 3, welding may be performed selectively in order from a lower position to an upper position with respect to a gravity direction among welding positions included in an image. For example, using gyro sensor information included in the photographing terminal 1 or installation information on the manipulator 3 included in the robot control apparatus 2, welding lines are selected in order from a lower position to an upper position after the definition of a gravity direction. Thus, it is possible to reduce the influence of thermal distortion or the like of a workpiece and drooping of bead or the like during welding.

As described above, a camera coordinate system is set in an image photographed by the photographing unit 211, and the operation path of the manipulator 3 is set in the camera coordinate system.

Then, the program generation unit 214 generates a working program for operating the manipulator 3 in a robot coordinate system, while converting the operation path of the manipulator 3 set in the camera coordinate system into the robot coordinate system on the basis of the position of a marker M installed on the manipulator 3. That is, the program generation unit 214 generates a working program on the basis of an operation path obtained by converting the operation path of the manipulator 3 set in the camera coordinate system into the robot coordinate system, while performing calibration to match the camera coordinate system and the robot coordinate system to each other. In the calibration, information on the position and attitude of the manipulator 3 included in an image photographed by the photographing unit 211 (camera coordinate system) and information on the position and attitude of the manipulator 3 grasped by the robot control apparatus 2 at the photographing of the image (robot coordinate system) are used as described above.

Robot Teaching Method

Next, a robot teaching method in which the robot teaching system 200 generates a working program allowing appropriate welding at a welding position using an image photographed by a camera will be described in detail.

FIG. 8 is a flowchart showing the flow of the processing of a robot teaching method M100 performed by the robot teaching system 200 according to an embodiment of the present invention. As shown in FIG. 8, the robot teaching method M100 includes steps S101 to S104, and the respective steps are performed by a processor included in the robot teaching system 200.

In step S101, the robot teaching system 200 photographs an image including a welding target and a marker installed on a welding robot. As a specific example, the photographing unit 211 in the robot teaching system 200 photographs an image simultaneously including a workpiece W serving as a welding target and a marker M installed on the welding torch 32 attached to the tip end of the manipulator 3. Further, information on the angles of the respective shafts of the manipulator 3 controlled by the robot control apparatus 2 or the like at the photographing is stored so as to be associated with the photographed image.

In step S102, the robot teaching system 200 sets a camera coordinate system on the basis of the marker included in the image photographed in step S101. As a specific example, the camera coordinate system setting unit 212 in the robot teaching system 200 sets, with the position of the marker M included in the image as an origin O, a three-dimensional orthogonal coordinate system based on X, Y, and Z axes orthogonal to each other at the origin O as a camera coordinate system.

In step S103, the robot teaching system 200 sets the operation path of the welding robot on the basis of the welding position of the welding target included in the image in the camera coordinate system set in step S102. As a specific example, the operation path setting unit 213 in the robot teaching system 200 sets the operation path of the manipulator 3 so that the welding torch 32 attached to the tip end of the manipulator 3 operates along the welding position of the workpiece in the camera coordinate system.

In step S104, the robot teaching system 200 generates a working program for operating the welding robot, while converting the operation path of the welding robot set in step S103 from the camera coordinate system into a robot coordinate system set in the robot control apparatus 2 on the basis of the position of the marker installed on the welding robot. As a specific example, the operation path setting unit 213 sets the operation path of the manipulator 3 in the camera coordinate system in step S103. The robot control apparatus 2 retains the robot coordinate system on the basis of the position of the marker M installed on the manipulator 3. Therefore, the program generation unit 214 converts the operation path of the manipulator 3 in the camera coordinate system into the robot coordinate system to set a path on which the manipulator 3 actually operates, and generates a working program to appropriately perform welding at a welding position.

As described above, in the robot teaching system 200 and the robot teaching method M100 according to an embodiment of the present invention, the photographing unit 211 photographs an image including a workpiece W serving as a welding target and a marker M installed on the manipulator 3, and the camera coordinate system setting unit 212 sets a camera coordinate system on the basis of the marker M included in the image. Then, the program generation unit 214 generates a working program for operating the manipulator 3, while converting the operation path of the manipulator 3 set in the camera coordinate system into a robot coordinate system set in the robot control apparatus 2 on the basis of the position of the marker M installed on the manipulator 3. Thus, it is possible to generate a working program allowing appropriate welding at a welding position.

As a result, without performing a robot teaching method depending on the skills of an operator in which a working program is generated while the manipulator 3 is precisely operated, it is possible to reduce dependence on the skills of the operator and efficiently generate the working program using an image photographed by a camera.

Note that one marker M is installed on the welding torch 32 of the manipulator 3 in the present embodiment but a plurality of markers M may be, for example, installed.

For example, when the photographing unit 211 photographs an image so as to include a workpiece W and a marker M, a part of the workpiece W or the marker M is not photographed or is shaded, or a photographing angle is not appropriate depending on positional relationships between the photographing terminal 1, the workpiece W, and the marker M. Therefore, a case that the image simultaneously including the marker M and the workpiece W may not be appropriately photographed is assumed. In this case, if another marker M is also installed on the (rear) side opposite to the marker M installed on the welding torch 32 of the manipulator 3, the photographing unit 211 is only required to photograph an image so as to include the workpiece W and one of the two markers M. That is, depending on the positional relationships between the photographing terminal 1, the workpiece W, and the plurality of markers M, it is possible to simultaneously and clearly photograph the workpiece W and any of the plurality of markers M.

Note that the plurality of markers M are not limited to two markers. However, three or four or more markers M may be, for example, installed so as to surround the periphery of the welding torch 32, or a plurality of markers may be installed in the vertical direction of the welding torch 32.

With the installation of a plurality of markers M as described above, accuracy is improved as the markers M are clearly photographed by the photographing unit 211, and limitations due to the attitude of the manipulator 3 are reduced.

Further, the photographing unit 211 may photograph a plurality of images. For example, when a welding position extends over a wide range in a workpiece W, the photographing unit 211 separately photographs, after moving a marker M close to the workpiece W, an image simultaneously including the marker M and a part of the welding position of the workpiece W a plurality of times. Then, the images obtained by separately photographing the image the plurality of times are overlapped with each other on the basis of the marker M included in the respective images. Thus, the photographing unit 211 is allowed to apply the images even if the welding position extends over a wide range.

Moreover, the photographing unit 211 may photograph an image simultaneously including the welding position of a workpiece W and a marker M a plurality of times at, for example, different angles. Then, images obtained by photographing the image the plurality of times are overlapped with each other on the basis of the marker M included in the respective images. Thus, if a welding position in a camera coordinate system is averaged, it is possible to reduce respective photographing errors and measurement errors and improve positional accuracy.

Note that the present embodiment shows an example in which the welding lines L1, L2, and L3 are extracted from an image using a distance measurement senor such as a LiDAR sensor. However, a peripheral environment or the like may be grasped using point group data acquired from the LiDAR sensor. For example, if the shape of a workpiece W, a mounting table, other obstacles, or the like is grasped, it is possible to set the operation path of the manipulator 3 while avoiding interference with the workpiece W, the mounting table, other obstacles, or the like.

The embodiments described above intend to facilitate the understanding of the present invention and do not intend to interpret the present invention in a limited way. Respective elements and their arrangements, materials, conditions, shapes, sizes, or the like provided in the embodiments are not limited to exemplified ones but may be appropriately modified. Further, it is also possible to partially replace or combine constituting elements shown in the different embodiments together.

What is claimed is:

1. A robot teaching system comprising:
a camera that generates a digital image simultaneously including a welding target and a marker installed on a tip end of an industrial robot, the tip end being disposed in a position that moves similarly to a welding torch attached to a tip of a manipulator of the industrial robot;
a terminal in communication with the camera and with the industrial robot, the terminal including a processor and a memory storing instructions which, when executed, cause the processor to:
generate an orthogonal camera coordinate system based on the marker included in the digital image;
generate an operation path of the industrial robot based on a welding position of the welding target included in the digital image and the camera coordinate system; and
convert the operation path of the industrial robot generated from the digital image into a robot coordinate system set in a robot control apparatus based on a position of the marker installed on the tip end of the industrial robot.

2. The robot teaching system according to claim 1, wherein the instructions, when executed, further cause the processor to:
generate the operation path of the industrial robot based on a welding position extracted from a welding position candidate, the welding position candidate being determined via image processing of the digital image.

3. The robot teaching system according to claim 2, wherein the instructions, when executed, further cause the processor to:

generate the operation path of the industrial robot based on a welding order set with respect to the welding position.

4. The robot teaching system according to claim 3, wherein the instructions, when executed, further cause the processor to:
determine a welding order and set the operation path of the industrial robot based on a distance between the welding position and the welding torch.

5. The robot teaching system according to claim 4, wherein the instructions, when executed, further cause the processor to:
determine the welding order based on a specific direction.

* * * * *